US010622867B2

(12) United States Patent
Tamura et al.

(10) Patent No.: US 10,622,867 B2
(45) Date of Patent: Apr. 14, 2020

(54) DRIVE DEVICE (71) Applicant: SUMITOMO HEAVY INDUSTRIES, LTD., Tokyo (JP)

(72) Inventors: Mitsuhiro Tamura, Aichi (JP); Akira Yamamoto, Aichi (JP); Koji Moritani, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 131 days.

(21) Appl. No.: 15/913,568

(22) Filed: Mar. 6, 2018

(65) Prior Publication Data
US 2018/0262085 A1 Sep. 13, 2018

(30) Foreign Application Priority Data

Mar. 13, 2017 (JP) .................................. 2017-046950

(51) Int. Cl.
*H02K 7/102* (2006.01)
*F16D 49/00* (2006.01)
(Continued)

(52) U.S. Cl.
CPC ............. *H02K 7/102* (2013.01); *B65G 29/00* (2013.01); *B65G 45/02* (2013.01); *F16D 65/02* (2013.01);
(Continued)

(58) Field of Classification Search
CPC ........ B65G 2201/0244; B65G 2811/09; B65G 29/00; B65G 45/02; F16D 49/00;
(Continued)

(56) References Cited

U.S. PATENT DOCUMENTS 4,807,354 A * 2/1989 Capuano .............. H02K 5/1672
29/401.1
8,133,143 B2 * 3/2012 Schoon ................ H02K 7/1025
180/371
(Continued)

FOREIGN PATENT DOCUMENTS

CN 100558592 C 11/2009
CN 101885333 A 11/2010
(Continued)

OTHER PUBLICATIONS

Office Action issued in German Application No. 10 2018 103 238.2, dated Sep. 28, 2018.
(Continued)

*Primary Examiner* — Alex W Mok
(74) *Attorney, Agent, or Firm* — Michael Best & Friedrich LLP (57) ABSTRACT

A drive device configured to drive a container transporting device for transporting a container is provided. The drive device includes a motor which generates power, a brake configured to brake a movement generated by the power of the motor, and a speed reducer which has an output shaft connected to a driven portion of the container transporting device, includes a lubricant enclosed therein, and is configured to decelerate the power of the motor and transmit the decelerated power to the output shaft, in which the speed reducer, the brake, and the motor are disposed in this order from above in a vertical direction, a first seal member configured to block the lubricant is provided between the speed reducer and the brake, and the brake includes an accommodation chamber which accommodates a leaked lubricant in a case where the lubricant enclosed in the speed reducer leaks past the first seal member.

20 Claims, 6 Drawing Sheets (51) Int. Cl.
| | |
|---|---|
| *F16D 65/02* | (2006.01) |
| *F16H 57/029* | (2012.01) |
| *F16H 57/021* | (2012.01) |
| *F16N 31/02* | (2006.01) |
| *B65G 45/02* | (2006.01) |
| *B65G 29/00* | (2006.01) |
| *H02K 5/16* | (2006.01) |
| *H02K 7/116* | (2006.01) |
| *F16N 9/02* | (2006.01) |
| *H02K 7/00* | (2006.01) |
| *H02K 5/10* | (2006.01) |

(52) U.S. Cl.
CPC ......... *F16H 57/021* (2013.01); *F16H 57/029* (2013.01); *F16N 9/02* (2013.01); *F16N 31/02* (2013.01); *H02K 5/16* (2013.01); *H02K 7/116* (2013.01); *B65G 2201/0244* (2013.01); *B65G 2811/09* (2013.01); *F16D 49/00* (2013.01); *F16N 2210/24* (2013.01); *H02K 5/10* (2013.01); *H02K 7/003* (2013.01)

(58) Field of Classification Search
CPC ...... F16D 65/02; F16H 57/021; F16H 57/029; F16N 2210/24; F16N 31/02; F16N 9/02; H02K 5/16; H02K 7/003; H02K 7/102; H02K 5/10; H02K 7/116
USPC .......................................................... 310/77
See application file for complete search history.

(56) References Cited

U.S. PATENT DOCUMENTS

| | | | |
|---|---|---|---|
| 9,353,813 B2 | 5/2016 | Okuno et al. | |
| 9,790,032 B2 * | 10/2017 | Lautenschlager | B65G 23/08 |
| 2002/0131658 A1 * | 9/2002 | Kottke | F16H 57/029 |
| | | | 384/485 |
| 2009/0078528 A1 * | 3/2009 | Uzawa | B60K 7/0007 |
| | | | 192/12 D |
| 2009/0312134 A1 * | 12/2009 | Schoon | H02K 7/1025 |
| | | | 475/154 |
| 2012/0093449 A1 * | 4/2012 | Ziemer | F16D 25/061 |
| | | | 384/130 |
| 2013/0000938 A1 * | 1/2013 | Matsunaga | B25B 21/008 |
| | | | 173/181 |
| 2013/0248303 A1 * | 9/2013 | Okuno | B60T 1/062 |
| | | | 188/67 |
| 2014/0174856 A1 * | 6/2014 | Takagi | B60K 6/445 |
| | | | 184/6.12 |
| 2014/0296016 A1 * | 10/2014 | Okada | F16H 57/0454 |
| | | | 475/159 |
| 2016/0046448 A1 * | 2/2016 | Lautenschlager | H02K 5/15 |
| | | | 198/617 |

FOREIGN PATENT DOCUMENTS

| | | |
|---|---|---|
| CN | 103097759 A | 5/2013 |
| CN | 103249969 A | 8/2013 |
| CN | 104712724 A | 6/2015 |
| CN | 105864410 A | 8/2016 |
| CN | 106965790 A | 7/2017 |
| DE | 197 41 476 A1 | 3/1999 |
| DE | 200 01 504 U1 | 7/2001 |
| DE | 10 2007 025 522 A1 | 12/2008 |
| DE | 10 2013 020 994 A1 | 6/2015 |
| JP | 6004170 B2 | 10/2016 |
| WO | 2010151743 A2 | 12/2010 |
| WO | WO-2014/139727 A2 | 9/2014 |

OTHER PUBLICATIONS

Office Action issued in Chinese Patent Application No. 201810153671.X, dated Dec. 25, 2019.

* cited by examiner

DRIVE DEVICE

RELATED APPLICATIONS

Priority is claimed to Japanese Patent Application No. 2017-046950, filed Mar. 13, 2017, the entire content of which is incorporated herein by reference.

BACKGROUND

Technical Field

Certain embodiments of the present invention relate to a drive device which drives a container transporting device.

Description of Related Art

In the related art, in an automated production process for producing articles by packing contents into a container, a container transporting device for transporting a plurality of containers in a continuous state is used. The container transporting device includes a plurality of holding portions which hold the containers, a transport mechanism which cyclically moves the plurality of holding portions through a predetermined path, and a drive device which drives the transport mechanism.

For example, the container transporting device is provided in each of a plurality of processes such as a process of cleaning the container, a process of loading the contents into the container, and a process of sealing the container. The plurality of containers are delivered from the container transporting device in the previous process to the container transporting device in the next process, and then, to the container transporting device in the next process, and thus, the plurality of containers pass through the plurality of processes. In the container transporting devices in the plurality of processes, the containers are delivered between the container transporting devices of the previous process and the following process, and thus, the container transporting devices are synchronously driven with each other.

SUMMARY

According to an embodiment of the present invention, there is provided a drive device configured to drive a container transporting device for transporting a container, including: a motor which generates power; a brake configured to brake a movement generated by the power of the motor; and a speed reducer which has an output shaft connected to a driven portion of the container transporting device, includes a lubricant enclosed therein, and is configured to decelerate the power of the motor and transmit the decelerated power to the output shaft, in which the speed reducer, the brake, and the motor are disposed in this order from above in a vertical direction, a first seal member configured to block the lubricant is provided between the speed reducer and the brake, and the brake includes an accommodation chamber which accommodates a leaked lubricant in a case where the lubricant enclosed in the speed reducer leaks past the first seal member.

BRIEF DESCRIPTION OF THE DRAWINGS

FIGS. 1A and 1B show a container transporting device to which a drive device according to a first embodiment of the present invention is applied.

DETAILED DESCRIPTION

In an automated production process, each device is required to be continuously operated during a long period of time. Accordingly, container transporting devices and drive devices are required to be able to be continuously driven without being stopped for a long period of time.

It is desirable to provide a drive device for driving a container transporting device capable of being continuously driven without being stopped for a long period of time.

According to the present invention, in the drive device which drives the container transporting device, it is possible to continuously drive the drive device without stopping the drive device for a long period of time.

Hereinafter, embodiments of the present invention will be described in detail with reference to the drawings.

First Embodiment

Figure 1A:
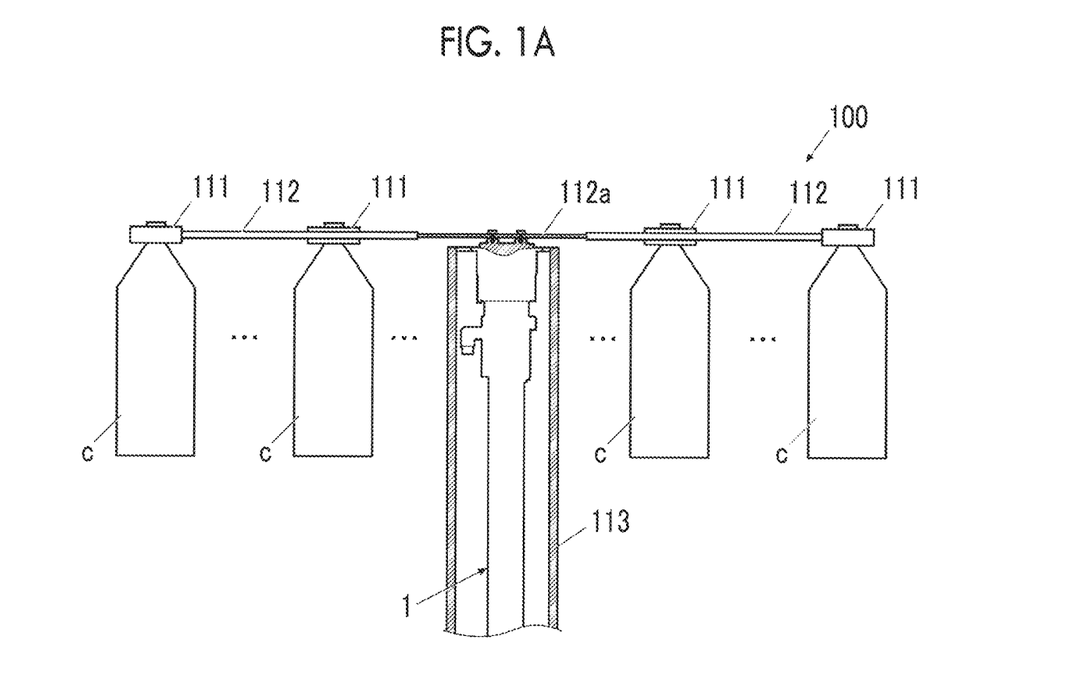
FIG. 1A is a partially broken side view.
Figure 1B:
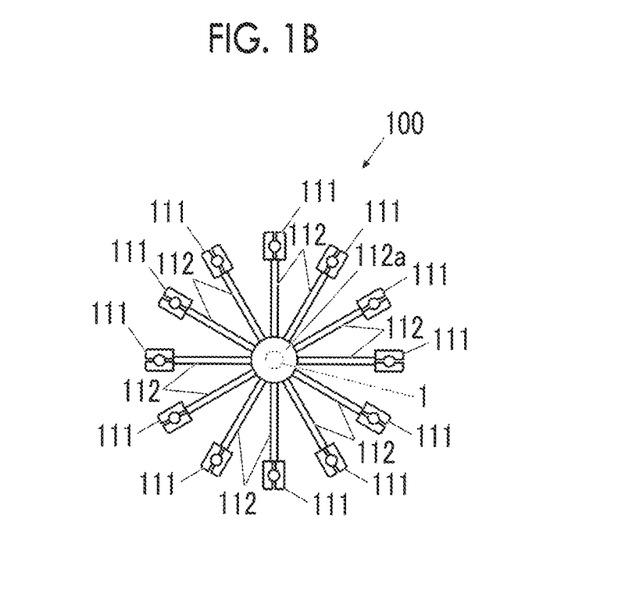
FIG. 1B is a plan view.

FIGS. 1A and 1B show a container transporting device to which a drive device according to a first embodiment of the present invention is applied, FIG. 1A is a partially broken side view, and FIG. 1B is a plan view.

A container transporting device 100 of FIGS. 1A and 1B is a device which transports a plurality of containers c in a continuous state in an automated production process for producing articles by packing contents into the containers c. Although not particularly limited, a bottle can be applied as the container c, and a food such as a drink or a seasoning, or a chemical agent such as a detergent or a cosmetic can be applied as the contents.

In the production process, processing of one or a plurality of processes is performed while the containers c are transported by one container transporting device 100. In addition, the plurality of containers c are sequentially delivered from the container transporting device of the previous process to the container transporting device of the next process, and thus, the containers c pass through the plurality of processes. For example, the plurality of processes include a process of cleaning and sterilizing the containers c, a process of filling the containers c with the contents, a process of sealing the containers c, or the like.

The container transporting device 100 includes a plurality of holding portions 111 which each hold one container c, transport mechanisms 112 which cyclically move the plurality of holding portions 111 through a predetermined path, and a drive device 1 which is connected to a driven portion 112a of the transport mechanisms 112 and drives the transport mechanisms 112. The drive device 1 may be covered with a case 113. Although not particularly limited, the container transporting device 100 of FIGS. 1A and 1B adopts an umbrella-shaped configuration in which the plurality of holding portions 111 are cyclically moved in a circumferential path centered on the drive device 1, when viewed in a vertical direction.

The container transporting device 100 is not limited to the umbrella-like configuration. For example, the container transporting device 100 may have a configuration in which the plurality of holding portions 111 are cyclically moved in an arbitrary path by means of a belt.

In the production process, the plurality of container transporting devices 100 are synchronously operated with each other such that the plurality of containers c can be sequentially delivered. In addition, in the automated production process, each container transporting device 100 and a device for processing each process are continuously operated for a long period of time. For example, a timing at which each container transporting device 100 is stopped is limited to less frequent timing such as when maintenances of all production processes are performed.

For example, in the production process, if one container transporting device 100 is stopped unexpectedly, devices of almost all the processes should be stopped. Accordingly, the container transporting device 100 and the drive device 1 are required to be continuously operated for a long period of time such that an unexpected stoppage does not occur.

Meanwhile, the drive device 1 is required to have a braking function. However, the container transporting device 100 is stopped less frequently, and thus, the requirement for stability of the braking function is relatively low. For example, when the production process starts, the braking function of the drive device 1 is required when a movable portion of each device is positioned. Meanwhile, when all devices in the production process are stopped, the container transporting device 100 can be stopped by stopping the supply of power to the drive device 1 without using the braking function.

Moreover, in the production process, processing of the plurality of processes is performed on the plurality of containers c while the plurality of containers c are transported. Accordingly, it may be required to make the drive device 1 compact in a horizontal direction in order to secure a space through which the plurality of containers c pass. In addition, it may be required to dispose an output shaft on an upper portion of the drive device 1 in order to prevent a power transfer path of the container transporting device 100 from being complicated.

Configuration of Drive Device

Figure 2:
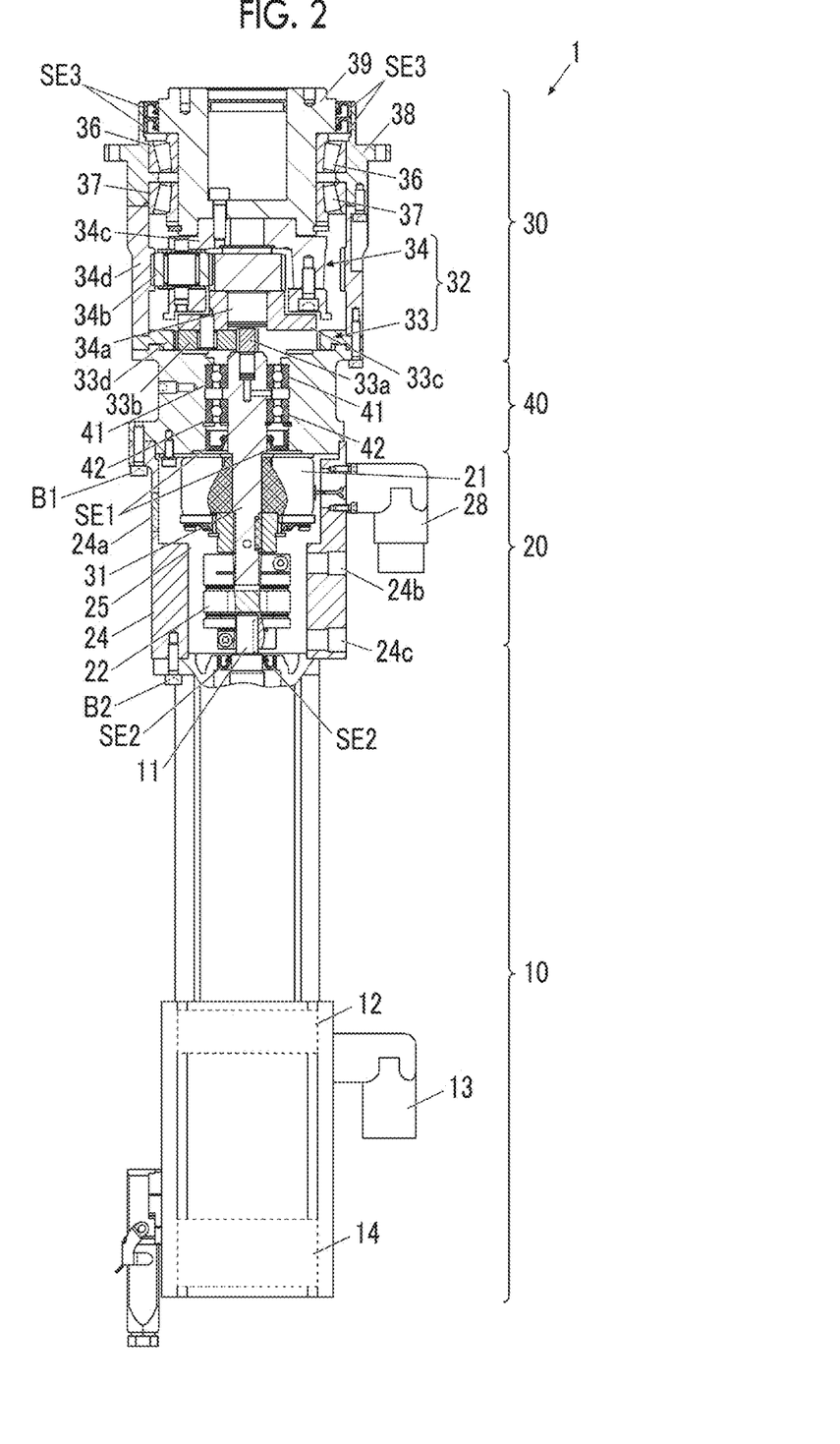
FIG. 2 is a longitudinal sectional view showing a drive device of the first embodiment.

FIG. 2 is a longitudinal sectional view showing the drive device of the first embodiment.

The drive device 1 includes a motor 10, a brake 20, and a speed reducer 30. A bearing portion 40 which rotatably supports an input shaft 31 of the speed reducer 30 is provided between the brake 20 and the speed reducer 30. The motor 10, the brake 20, and the speed reducer 30 are arranged in a line in a vertical direction, and a motor shaft 11 of the motor 10 and the input shaft 31 and an output shaft 39 of the speed reducer 30 are coaxially arranged. A use direction of the drive device 1 is defined, and in the defined direction (vertical direction), the speed reducer 30, the brake 20, and the motor 10 are arranged in this order from above. Although it will be described in detail later, the drive device 1 of the first embodiment includes bearings 41 and 42, which support a brake shaft of the brake 20 or the input shaft 31 of the speed reducer, on the speed reducer 30 side from the first seal member SE1.

The motor 10 is a servo motor having a rotation position detection portion (sensor) 12 such as an encoder and electrically generates power to rotate the motor shaft 11. The motor 10 includes a sensor which detects information required to control the motor 10, and may be configured of a synchronous motor, for example. For example, for the rotation position detection portion 12, various configurations such as an encoder using a hall element or an encoder using a light emitting element and a light receiving element can be applied. The rotation position detection portion 12 is provided on a side (lower side in the vertical direction) opposite to a load from a rotor (not shown). The motor 10 includes a connector 13, and electric power is input and a signal indicating a rotation position is output via the connector 13. In addition, a cooling fan 14 is built in the motor 10.

The brake 20 includes a braking mechanism portion 21, a shaft connecting portion 22 having a friction fastener, and a housing 24 with which the braking mechanism portion 21 and the shaft connecting portion 22 are covered. The braking mechanism portion 21 can adopt a known configuration in which a rotating shaft portion (for example, the input shaft 31 of the speed reducer 30) passes through the inside thereof and a braking force is applied to the shaft portion by electric driving, for example, using a friction force. Accordingly, the movement generated by the power of the motor 10 can be braked. A connector 28 is provided in the housing 24 and power for driving the braking mechanism portion 21 is input from the connector 28. The shaft connecting portion 22 detachably connects the motor shaft 11 of the motor 10 and the shaft portion (input shaft 31 of the speed reducer 30) which passes through the braking mechanism portion 21 to each other.

An accommodation chamber 25 which can accommodate a lubricant when the lubricant leaks from the speed reducer 30 is provided between the housing 24, and the braking mechanism portion 21 and the shaft connecting portion 22. A space of the accommodation chamber 25 has a volume larger than a total amount of the lubricant supplied to the speed reducer 30. Here, the volume of the space of the accommodation chamber 25 means a volume obtained by subtracting a volume occupied by configuration members of the motor 10 and the brake 20 from an internal space of the housing 24 between a first seal member SE1 and a second seal member SE2 described later, and corresponds to a volume of the space into which the lubricant can flow.

The housing 24 includes a transparent window 24a through which the inside of the accommodation chamber 25 can be viewed from the outside of the housing 24, and tool holes 24b and 24c through which a tool for fastening fasteners at two locations of the shaft connecting portion 22 can be inserted from the outside of the housing 24. When the drive device 1 is operated, plugs are inserted into the tool holes 24b and 24c. However, it is possible to view the inside of the accommodation chamber 25 by removing the plugs from the tool holes 24b and 24c. That is, the tool holes 24b and 24c also serve as the window. The reason for viewing the inside of the accommodation chamber 25 through the window 24a or the tool holes 24b and 24c includes the reason to check whether or not the lubricant of the speed reducer 30 leaks to the brake 20. In addition, in a case where the plugs are not inserted into the tool holes 24b and 24c when the drive device 1 is operated and the lubricant leaks to the brake 20, the lubricant may flow out of the housing 24 from the tool holes 24b and 24c. Accordingly, even when the inside of the accommodation chamber 25 is not viewed, it is possible to check that the lubricant leaks to the brake 20.

The speed reducer 30 includes the input shaft 31, the output shaft 39 which is connected to the driven portion 112a of the container transporting device 100, a reduction mechanism portion 32 which reduces the rotary motion of the input shaft 31 and transmits the reduced rotational motion to the output shaft 39, and a housing 38 with which the reduction mechanism portion 32 is covered. Although not particularly limited, the reduction mechanism portion 32 is mainly configured of planetary gear mechanisms 33 and 34 of two stages. The first stage planetary gear mechanism 33 includes a sun gear 33a, a planetary gear 33b, a planetary carrier 33c, and an internal gear 33d. The second stage planetary gear mechanism 34 includes a sun gear 34a, a planetary gear 34b, a planetary carrier 34c, and an internal gear 34d. Moreover, the speed reducer 30 includes a pair of bearings (for example, taper bearings) 36 and 37 which rotatably supports the output shaft 39. The bearings 36 and 37 are disposed on the output side from the reduction mechanism portion 32.

The bearing portion 40 is disposed between the brake 20 and the speed reducer 30, and includes a pair of bearings 41 and 42 which rotatably supports the input shaft 31 of the speed reducer 30. For example, the bearings 41 and 42 are radial bearings.

Seal Configuration of Lubricant

The drive device 1 includes the first seal member SE1, the second seal member SE2, and a third seal member SE3 which blocks the lubricant.

The first seal member SE1 is provided between the speed reducer 30 and the brake 20, specifically, is provided on an inner periphery of the penetrating hole in the bearing portion 40 through which the input shaft 31 passes. The first seal member SE1 is disposed below the bearings 41 and 42, and the lubricant enters the bearings 41 and 42 to perform lubrication of the bearings 41 and 42.

The second seal member SE2 is provided between the motor 10 and the brake 20, specifically, is provided in an upper opening portion of the motor 10 through which the motor shaft 11 passes.

The third seal member SE3 is provided in an upper opening portion of the housing 38 through which the output shaft 39 of the speed reducer 30 passes. The third seal member SE3 is provided above the bearings 36 and 37.

In the above-described seal configurations, the lubricant is enclosed in the speed reducer 30 by the first seal member SE1 and the third seal member SE3. This lubricant lubricates the reduction mechanism portion 32, the bearings 36 and 37, and the bearings 41 and 42. In a case where the lubricant leaks past the location of the first seal member SE1, the lubricant stays in the accommodation chamber 25 of the brake 20 once, and in a case where the lubricant further flows downward, the second seal member SE2 restrains the lubricant from flowing to the motor 10. Accordingly, even if the lubricant leaks at the locations of the first seal member SE1 and the second seal member SE2, it is possible to lengthen a period during which the lubricant moves from the speed reducer 30 to the rotation position detection portion 12 of the motor 10.

Separable Structure

Figure 3:
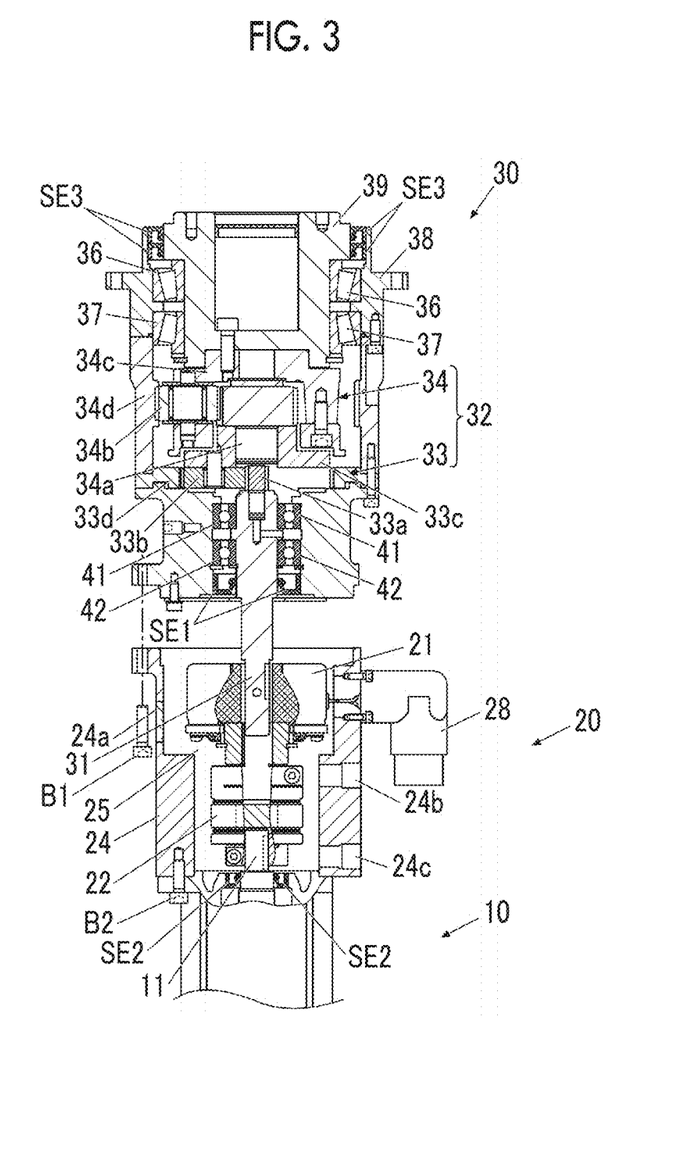
FIG. 3 is a view showing a state where a portion of a speed reducer in the drive device of the first embodiment is separated.
Figure 4:
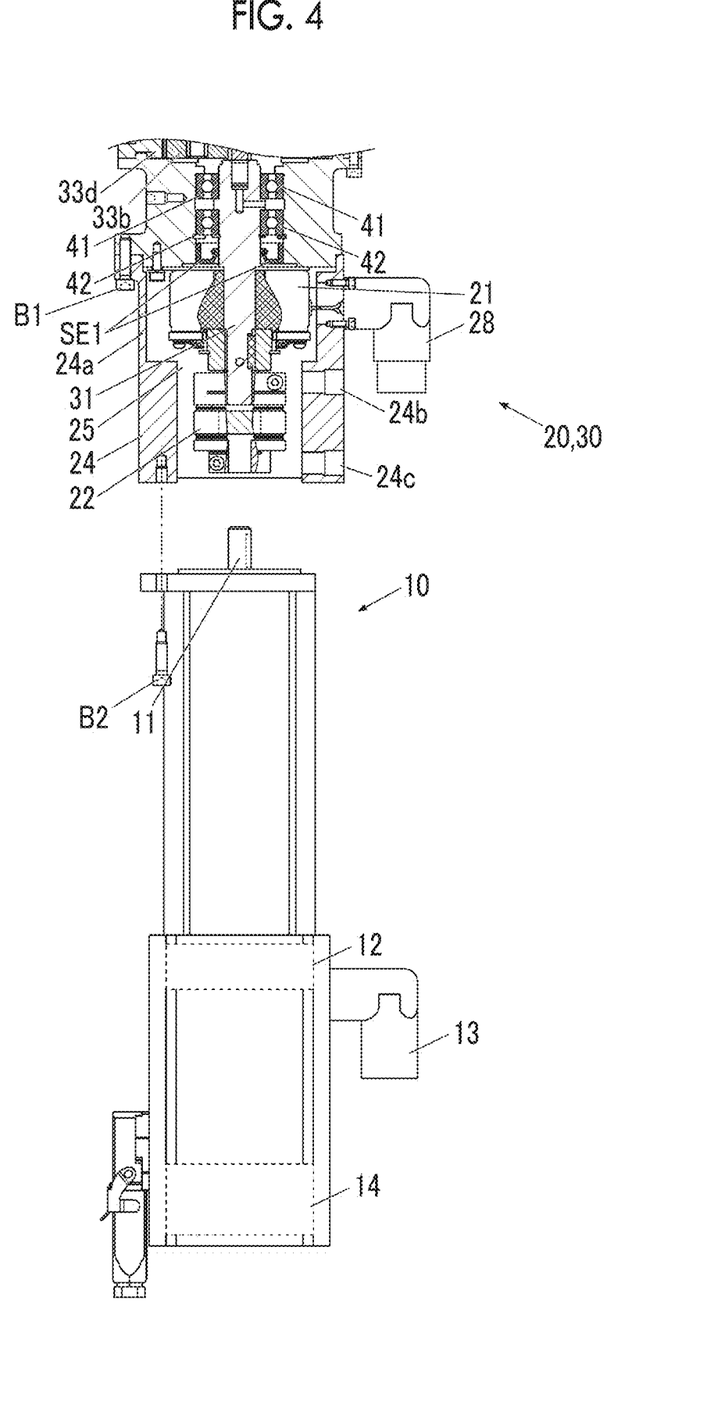
FIG. 4 is a view showing a state where a portion of a motor in the drive device of the first embodiment is separated.

FIG. 3 is a view showing a state where the speed reducer in the drive device of the first embodiment is separated. FIG. 4 is a view showing a state where the motor in the drive device of the first embodiment is separated.

As shown in FIG. 3, in addition to the bearing portion 40, the speed reducer 30 can be separated in a state where the motor 10 and the brake 20 are connected to each other. When the separation is performed, fastening between the shaft connecting portion 22 and the input shaft 31 is released in the brake 20 by removing a bolt B1. Accordingly, the speed reducer 30 can be separated. In FIGS. 2 to 4, only one bolt B1 is shown. However, the bearing portion 40 is connected to the brake 20 by a plurality of bolts B1 at a plurality of locations in a circumferential direction of the drive device 1.

In addition, as shown in FIG. 4, the motor 10 can be separated in a state where the brake 20 and the speed reducer 30 are connected to each other. When the separation is performed, fastening between the shaft connecting portion 22 and the motor shaft 11 is released in the brake 20 by removing a bolt B2. Accordingly, the motor 10 can be separated. In FIGS. 2 to 4, only one bolt B2 is shown. However, the motor 10 is connected to the brake 20 by a plurality of bolts B2 at a plurality of locations in a circumferential direction of the drive device 1.

As described above, according to the drive device 1 of the first embodiment, the speed reducer 30, the brake 20, and the motor 10 are arranged in this order from above in the vertical direction. Accordingly, the output shaft 39 is disposed on the upper portion, and an aspect having a small size in the horizontal direction can be realized. Therefore, the drive device 1 can be applied to the container transporting device 100 in which this aspect is required.

Moreover, in this aspect, if the lubricant leaks from the speed reducer 30 and the lubricant moves by its own weight to enter the rotation position detection portion 12 of the motor 10, there is a concern that the drive device 1 is stopped unexpectedly. However, according to the drive device 1 of the first embodiment, the brake 20 is disposed between the motor 10 and the speed reducer 30, and the first seal member SE1, the accommodation chamber 25 of the lubricant, and the second seal member SE2 are provided above the motor 10. Accordingly, even if the lubricant leaks at the location of the first seal member SE1, it is possible to lengthen the period during which the lubricant flows to a portion above the motor 10. Accordingly, thereafter, even when the leakage of the lubricant is generated at the location of the second seal member SE2, it is possible to lengthen a period until the lubricant enters the rotation position detection portion 12 which is easily influenced adversely by the lubricant in the motor 10. Accordingly, it is possible to restrain the motor 10 from being unexpectedly stopped by the leakage of the lubricant.

In addition, according to the drive device 1 of the first embodiment, the configuration (window 24a or tool holes 24b and 24c) through which the inside of the accommodation chamber 25 of the motor 10 can be viewed is provided. Therefore, for example, when maintenance or the like is performed, whether or not the lubricant leaks to the accommodation chamber 25 via the window 24a or the like is checked, and if the leakage occurs, countermeasures such as replacement of the drive device 1 can be performed. Here, a case where the leakage of the lubricant is generated at the location of the first seal member SE1 immediately after the maintenance is performed is assumed. Even in this case, the lubricant does not easily flow to the rotation position detection portion 12 of the motor 10, it is unlikely that the motor 10 is unexpectedly stopped until the next maintenance is performed, and thus, it is possible to find the leakage of the lubricant at the next maintenance. In addition, in a case where the leakage is found, the countermeasures such as the replacement of the drive device 1 are performed, and thus, it is possible to restrain occurrence of a situation in which the container transporting device 100 is unexpectedly stopped during the production process.

In addition, according to the drive device 1 of the first embodiment, the speed reducer 30 can be separated in a state where the motor 10 and the brake 20 are connected to each other, and the motor 10 can be separated in a state where the speed reducer 30 and the brake are connected to each other.

Accordingly, in a case where the leakage of the lubricant is found and the drive device 1 is replaced, a normal portion can be used as a portion of the drive device 1 for next replacement. Alternatively, in a case where the leakage of the lubricant is found, only the portions of the speed reducer 30 and the bearing portion 40 can be replaced by cleaning the lubricant leaked to the brake 20. In addition, in a case where the leakage of the lubricant to the brake 20 is severe, the motor 10 can be diverted and only the portions of the speed reducer 30 and the bearing portion 40 can be replaced.

Second Embodiment

Figure 5:
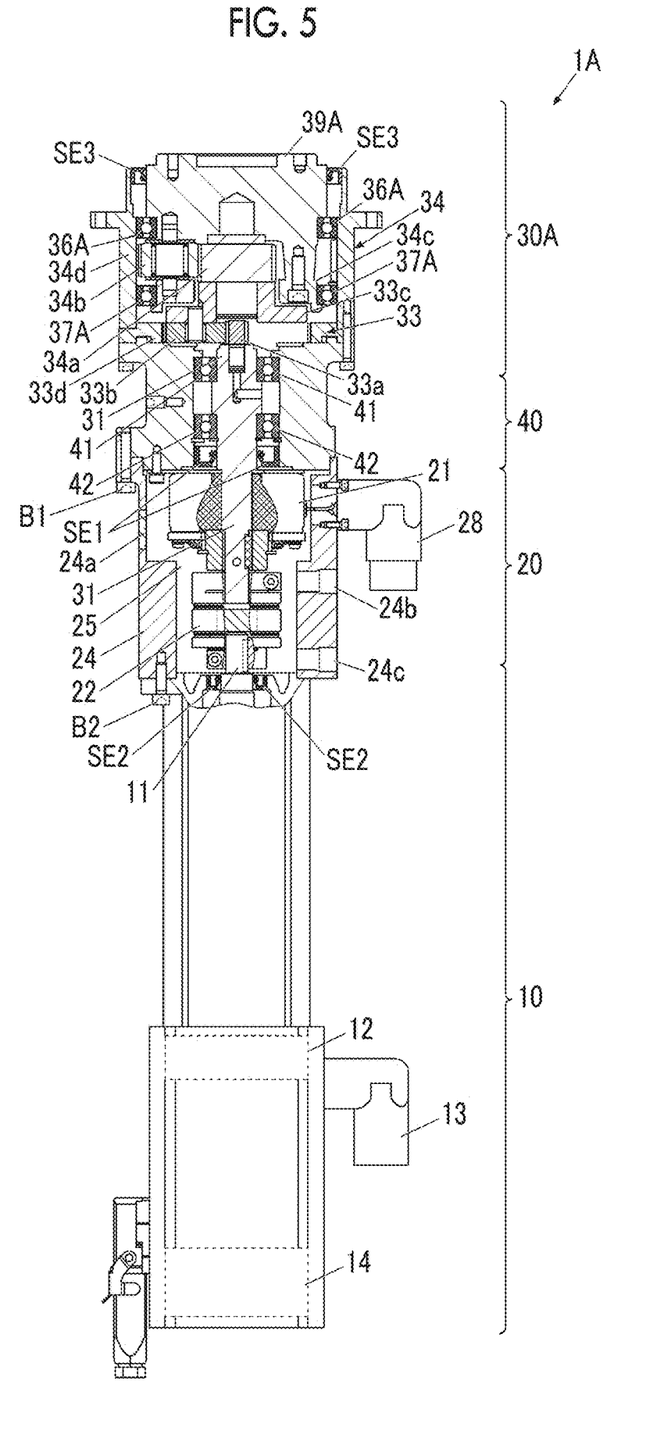
FIG. 5 is a longitudinal sectional view showing a drive device of a second embodiment.

FIG. 5 is a longitudinal sectional view showing a drive device of a second embodiment.

A drive device 1A of the second embodiment is different from the drive device 1 of the first embodiment only in a configuration of an output shaft 39A of a speed reducer 30A and a configuration of a bearing thereof. Other portions are similar to those of the drive device 1 of the first embodiment. The same reference numerals as those of the first embodiment are assigned to the similar portions, and overlapping descriptions are omitted.

In the second embodiment, the output shaft 39A of the speed reducer 30A is rotatably supported by a pair of bearings 36A and 37A. For example, the bearings 36A and 37A are radial bearings. The output shaft 39A is integrated with the planetary carrier 34c of the second stage planetary gear mechanism 34, and the bearings 36A and 37A rotatably support the output shaft 39A and the planetary carrier 34c. Accordingly, the pair of bearings 36A and 37A is disposed at a position above the reduction mechanism portion 32 and at a position of the height in the middle of the reduction mechanism portion 32.

In the drive device 1A of the second embodiment, effects similar to those of the first embodiment are exerted.

Third Embodiment

Figure 6:
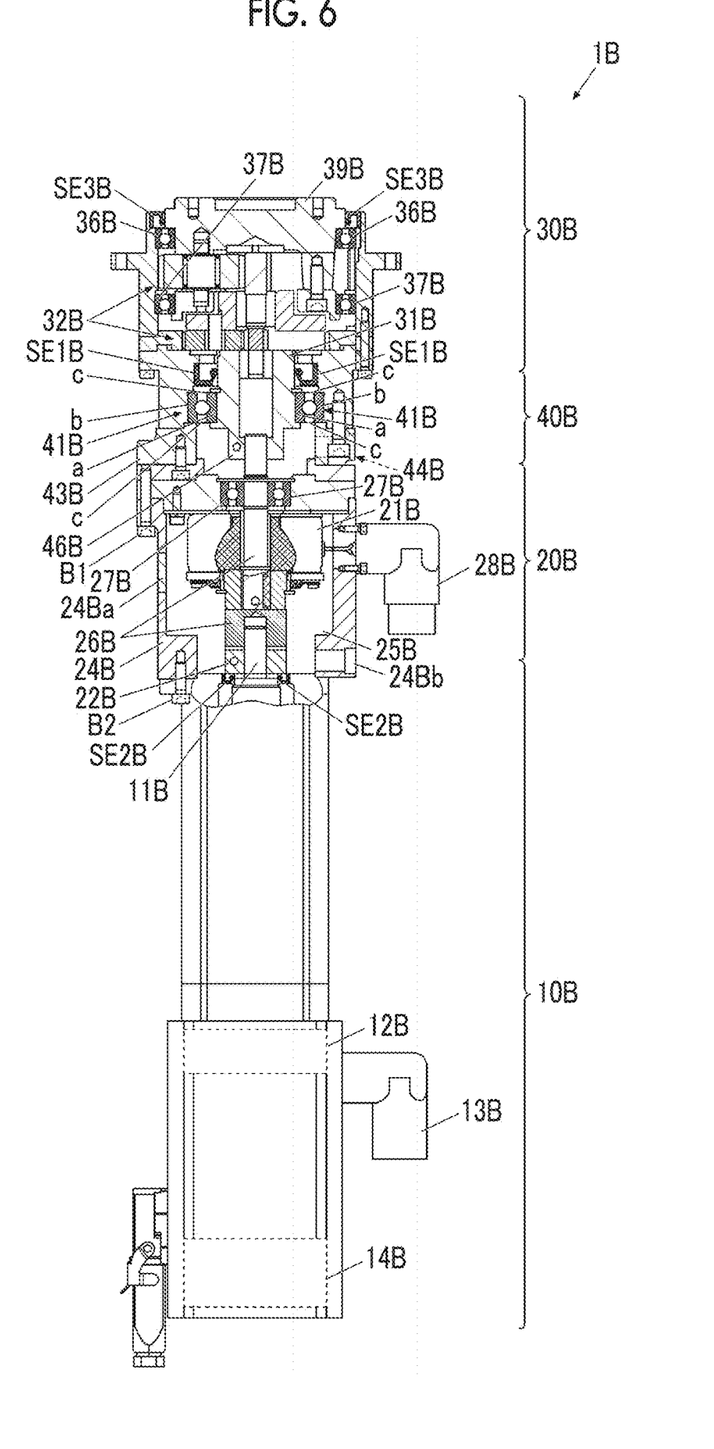
FIG. 6 is a longitudinal sectional view showing a drive device of a third embodiment.

FIG. 6 is a longitudinal sectional view showing a drive device of a third embodiment.

The drive device 1B of the third embodiment includes a motor 10B, a brake 20B, and a speed reducer 30B. A bearing portion 40B which rotatably supports an input shaft 31B of the speed reducer 30B or a brake shaft 26B of the brake 20B is provided between the brake 20B and the speed reducer 30B. The motor 10B, the brake 20B, and the speed reducer 30B are arranged in a line in a vertical direction, and a motor shaft 11B of the motor 10B and the input shaft 31B and an output shaft 39B of the speed reducer 30B are coaxially arranged. A use direction of the drive device 1B is defined, and in the defined direction (vertical direction), the speed reducer 30B, the brake 20B, and the motor 10B are arranged in this order from above. Although it will be described in detail later, the drive device 1B of the third embodiment includes bearings 41B and 27B, which support the brake shaft 26B of the brake 20B or the input shaft 31B of the speed reducer, on an accommodation chamber 25B side from a first seal member SE1B.

The motor 10B has the configuration similar to that of the motor 10 of the first embodiment, and includes a rotation position detection portion 12B, a connector 13B, and a cooling fan 14B.

The brake 20B includes a braking mechanism portion 21B, a brake shaft 26B, a shaft connecting portion 22B, a housing 24B with which the braking mechanism portion 21B and the shaft connecting portion 22B are covered, and a bearing 27B which rotatably supports the brake shaft 26B.

The braking mechanism portion 21B is configured similarly to that of the first embodiment. The braking mechanism portion 21B passes through the inside of the brake shaft 26B and applies a braking force to the brake shaft 26B. Similarly to the first embodiment, the housing 24B includes a window 24Ba, a tool hole 24Bb, and a connector 28B.

An accommodation chamber 25B which has a space capable of accommodating a lubricant when the lubricant leaks from the speed reducer 30B is provided between the housing 24B, and the braking mechanism portion 21B and the shaft connecting portion 22B. A space of the accommodation chamber 25B has a volume larger than a total amount of the lubricant enclosed in the speed reducer 30B.

The motor shaft 11B of the motor 10B and a lower end of the brake shaft 26B are detachably connected to each other by the shaft connecting portion 22B. The connection or the release of the shaft connecting portion 22B can be performed using the tool inserted into the tool hole 24Bb.

The bearing 27B supports the brake shaft 26B on the speed reducer 30B side from the braking mechanism portion 21B. The bearing 27B is a shield type bearing (also referred to as a "ZZ bearing") or a seal type bearing.

The speed reducer 30B includes the input shaft 31B, the output shaft 39B which is connected to the driven portion 112a of the container transporting device 100, and a reduction mechanism portion 32B which reduces the rotary motion of the input shaft 31B and transmits the reduced rotational motion to the output shaft 39B. The reduction mechanism portion 32B is configured similarly to that of the first embodiment. The speed reducer 30 includes a pair of bearings (for example, radial bearings) 36B and 37B which rotatably supports the output shaft 39. The bearings 36B and 37B are configured to be similar to that of the second embodiment.

The bearing portion 40B is disposed between the brake 20B and the speed reducer 30B, and includes a bearing 41B which rotatably supports the input shaft 31 of the speed reducer 30. The bearing 41B is a shield type bearing (also referred to as a "ZZ bearing") having a shield plate c between an inner ring a and an outer ring b. The shield plate c corresponds to a "restraining member which restrains the passage of the lubricant" of the present invention. The bearing 41B may be a seal type bearing which adopts a seal member instead of the shield plate c. Grease is applied to a portion between the pair of shield plates c and c.

In addition, the bearing portion 40B includes a shaft connecting portion 46B and a housing 43B having a tool hole 44B. The shaft connecting portion 46B can perform a connection between the input shaft 31B of the speed reducer 30B and an upper end portion of the brake shaft 26B and a release therebetween using a tool inserted into the tool hole 44B.

Seal Configuration of Lubricant

The drive device 1B of the second embodiment includes the first seal member SE1B which restrains the passage of the lubricant enclosed in the speed reducer 30B, a second seal member SE2B, and a third seal member SE3B.

The second seal member SE2B and the third seal member SE3B have the configurations similar to those of the first embodiment and are disposed similarly to those of the first embodiment. The first seal member SE1B is provided between the brake 20B and the speed reducer 30B. Specifically, the first seal member SE1B is provided above the bearing 41B on an inner periphery of the penetrating hole in the bearing portion 40B through which the input shaft 31B passes.

In the above-described seal configurations, the lubricant is enclosed in the speed reducer 30 by the first seal member SE1B and the third seal member SE3B. This lubricant lubricates the reduction mechanism portion 32. In a case where the lubricant leaks at the location of the first seal member SE1B, first, the lubricant is restrained from moving to the brake 20B side by the shield plate c of the bearing 41B and the shield plate of the bearing 27B. Next, in a case where the lubricant passes through the bearings 41B and 27B and enters to the brake 20B, the lubricant stays in the accommodation chamber 25B once, and in a case where the lubricant further flows downward, the second seal member SE2B restrains the lubricant from flowing to the motor 10B. Accordingly, even if the lubricant leaks at the locations of the first seal member SE1B and the second seal member SE2B, it is possible to lengthen a period during which the lubricant moves from the speed reducer 30 to the rotation position detection portion 12 of the motor 10.

Separable Structure

In addition to the bearing portion 40B, the speed reducer 30B can be separated in a state where the motor 10B and the brake 20B are connected to each other. When the separation is performed, fastening between the shaft connecting portion 46B and the brake shaft 26B is released in the bearing portion 40B by removing the bolt B1. Accordingly, the speed reducer 30 can be separated.

The motor 10B can be separated in a state where the brake 20B and the speed reducer 30B are connected to each other. When the separation is performed, fastening between the shaft connecting portion 22B and the motor shaft 11B is released in the brake 20B by removing the bolt B2. Accordingly, the motor 10B can be separated.

Hereinbefore, according to the drive device 1B of the third embodiment, even when the leakage of the lubricant of the speed reducer 30B is generated, the passage of the lubricant is restrained by the first seal member SE1B, the shield plate c of the bearing 41B, the shield plate of the bearing 27B, the accommodation chamber 25B, and the second seal member SE2B. Accordingly, it is possible to lengthen the period until the lubricant enters the rotation position detection portion 12B of the motor 10B. Therefore, similarly to the first embodiment, it is possible to restrain occurrence of the situation in which the container transporting device 100 is unexpectedly stopped during the production process.

Hereinbefore, the embodiments of the present invention are described. However, the present invention is not limited to the above-described embodiments. For example, in the embodiments, the motor shafts 11 and 11B to the input shafts 31 and 31B of the speed reducers 30, 30A, and 30B are connected to each other so as to integrally rotate with each other. Therefore, by changing the connection position between the motor shaft and the input shaft, or by interposing the brake shaft as in the third embodiment, the shaft supported by the bearing therebetween can be changed to the motor shaft, the input shaft, or the brake shaft.

Moreover, in the above-described embodiments, the example in which the second seal member is provided between the brake and the motor is described. However, in a case where a lubricant having high viscosity is adopted, the second seal member may be not provided. Even when the second seal member is not provided, the lubricant is collected in the accommodation chamber provided in the brake, and similar effects that the period until the lubricant enters the motor can be lengthened are obtained. Moreover, the type of the motor is not particularly limited, and for example, the motor may be a motor which does not require the sensor such as the rotation position detection portion 12. In addition, the details shown in the embodiments such as the type of the reduction mechanism portion, the type of the brake, or the detail position of the seal member can be appropriately changed within a scope which does not depart from the gist of the present invention.

What is claimed is:

1. A drive device configured to drive a container transporting device for transporting a container, comprising:
    a motor which generates power;
    a brake configured to brake a movement generated by the power of the motor; and
    a speed reducer which has an output shaft connected to a driven portion of the container transporting device, includes a lubricant enclosed therein, and is configured to decelerate the power of the motor and transmit the decelerated power to the output shaft,
    wherein the speed reducer, the brake, and the motor are disposed in this order from above in a vertical direction,
    wherein a first seal member configured to block the lubricant is provided between the speed reducer and the brake, and
    wherein the brake includes an accommodation chamber which accommodates a leaked lubricant in a case where the lubricant enclosed in the speed reducer leaks past the first seal member.

2. The drive device according to claim 1,
    wherein the motor includes a sensor configured to detect information required to control the motor.

3. The drive device according to claim 1, further comprising:
    a second seal member configured to block the lubricant between the brake and the motor.

4. The drive device according to claim 1, further comprising:
    a bearing configured to support a brake shaft of the brake or an input shaft of the speed reducer on the speed reducer side from the first seal member.

5. The drive device according to claim 1, further comprising:
    a bearing configured to support a brake shaft of the brake or an input shaft of the speed reducer on the accommodation chamber side from the first seal member,
    wherein the bearing includes a restraining member configured to restrain passage of the lubricant between an inner ring and an outer ring.

6. The drive device according to claim 1,
    wherein the accommodation chamber has a volume larger than an amount of the lubricant enclosed in the speed reducer.

7. The drive device according to claim 1, further comprising:
    a window through which the inside of the accommodation chamber is viewed.

8. The drive device according to claim 7,
    wherein the accommodation chamber has a tool hole for inserting a tool for fastening a fastener for fastening a motor shaft of the motor and an input shaft of the brake to each other, and
    wherein the tool hole also serves as the window.

9. The drive device according to claim 1,
    wherein the speed reducer is separable in a state where the motor and the brake are connected to each other and the motor is separable in a state where the speed reducer and the brake are connected to each other.

10. The drive device according to claim 1, wherein the accommodation chamber is between the motor and the speed reducer.

11. The drive device according to claim 1, wherein the speed reducer, the brake, and the motor are disposed in this order from above in a gravity direction.

12. The drive device according to claim 1, wherein the accommodation chamber surrounds a braking mechanism portion of the brake, the braking mechanism portion is configured to apply a braking force to an input shaft of the speed reducer.

13. The drive device according to claim 1, wherein the accommodation chamber does not fill up with the lubricant when the speed reducer is not leaking the lubricant.

14. The drive device according to claim 1, wherein a cross-section of the accommodation chamber that is closest to the speed reducer is wider than a cross-section of the accommodation chamber that is closest to the motor.

15. The drive device according to claim 1, wherein before an operation of the speed reducer, the leaked lubricant is not accommodated in the accommodation chamber.

16. A drive device comprising:
a motor that generates power; and
an accommodation chamber disposed in a brake,
wherein the accommodation chamber is configured to store a lubricant that enters the brake when the lubricant leaks from a speed reducer and
the speed reducer, the brake, and the motor are disposed in this order from above in a gravity direction.

17. The drive device according to claim 16, wherein the accommodation chamber surrounds a braking mechanism portion of the brake, the braking mechanism portion is configured to apply a braking force to an input shaft of the speed reducer.

18. The drive device according to claim 16, further comprising:
a tool hole configured to permit an insertion of a tool into the accommodation chamber.

19. The drive device according to claim 16, further comprising:
a window through which inside of the accommodation chamber is viewable, the tool hole is the window.

20. The drive device according to claim 16, wherein the accommodation chamber does not fill up with the lubricant when the speed reducer is not leaking the lubricant.

* * * * *